(12) United States Patent
Dai et al.

(10) Patent No.: US 11,069,088 B2
(45) Date of Patent: Jul. 20, 2021

(54) VISUAL POSITIONING METHOD AND APPARATUS, ELECTRONIC DEVICE, AND SYSTEM

(71) Applicant: BEIJING SENSETIME TECHNOLOGY DEVELOPMENT CO., LTD., Beijing (CN)

(72) Inventors: Xing Dai, Beijing (CN); Zhe Wang, Beijing (CN); Jianping Shi, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 29 days.

(21) Appl. No.: 16/626,005

(22) PCT Filed: May 23, 2019

(86) PCT No.: PCT/CN2019/088207
§ 371 (c)(1),
(2) Date: Dec. 23, 2019

(87) PCT Pub. No.: WO2019/233286
PCT Pub. Date: Dec. 12, 2019

(65) Prior Publication Data
US 2021/0158567 A1    May 27, 2021

(30) Foreign Application Priority Data
Jun. 5, 2018 (CN) .......................... 201810581686.6

(51) Int. Cl.
*G06T 7/80* (2017.01)
*G06K 9/00* (2006.01)
(Continued)

(52) U.S. Cl.
CPC ............ *G06T 7/80* (2017.01); *G06K 9/00798* (2013.01); *H04N 5/2253* (2013.01);
(Continued)

(58) Field of Classification Search
CPC .................................................. G06K 9/00798
See application file for complete search history.

(56) References Cited

U.S. PATENT DOCUMENTS 9,536,306 B2    1/2017  Natroshvili
9,830,706 B2   11/2017  Barajas Hernandez et al.
(Continued)

FOREIGN PATENT DOCUMENTS

CN    102915532 A    2/2013
CN    102661733 B    6/2014
(Continued)

OTHER PUBLICATIONS

Stephanie Hold et al: "A novel approach for the online initial calibration of extrinsic parameters for a car-mounted camera", Intelligent Transportation Systems, 2009. ITSC '09. 12th International IEEE Conference on, IEEE, Piscataway, NJ, USA, Oct. 4, 2009 (Oct. 4, 2009), pp. 1-6, XP031560117, ISBN: 978-1-4244-5519-5 the whole document.
(Continued)

*Primary Examiner* — Clifford Hilaire
(74) *Attorney, Agent, or Firm* — Syncoda LLC; Feng Ma

(57) ABSTRACT

A visual positioning method includes: detecting a lane line of a surface based on a video stream of the road surface collected by a camera mounted on a vehicle; determining first reference point information at a current angle of view according to a detection result of the lane line; determining a third homography matrix according to the first and second reference point information at a previous angle of view of the camera, the position of a second reference point corre-
(Continued)

sponds to that of a first reference point, and the third homography matrix is used for representing a mapping relationship between a coordinate of the camera at the current angle of view and a coordinate of the camera at the previous angle of view; determining a first homography matrix according to the third homography matrix and a predetermined homography matrix; and performing positioning according to the first homography matrix.

20 Claims, 15 Drawing Sheets

(51) Int. Cl.
  *H04N 5/225* (2006.01)
  *H04N 5/232* (2006.01)
  *H04N 17/00* (2006.01)

(52) U.S. Cl.
  CPC ....... *H04N 5/23299* (2018.08); *H04N 17/002* (2013.01); *G06T 2207/10016* (2013.01); *G06T 2207/30244* (2013.01); *G06T 2207/30256* (2013.01)

(56) References Cited

U.S. PATENT DOCUMENTS

| | | | |
|---|---|---|---|
| 10,339,663 | B2 | 7/2019 | Barajas Hernandez et al. |
| 2011/0228101 | A1* | 9/2011 | Miksch ............... H04N 17/002 348/175 |
| 2013/0002871 | A1 | 1/2013 | Natroshvili |
| 2014/0327765 | A1 | 11/2014 | Hsien et al. |
| 2017/0084037 | A1 | 3/2017 | Barajas Hernandez et al. |
| 2017/0243069 | A1 | 8/2017 | Shen |
| 2018/0040137 | A1 | 2/2018 | Barajas Hernandez et al. |

FOREIGN PATENT DOCUMENTS

| | | |
|---|---|---|
| CN | 105574552 A | 5/2016 |
| CN | 106443650 A | 2/2017 |
| CN | 106446815 A | 2/2017 |
| CN | 106981074 A | 7/2017 |
| CN | 107221007 A | 9/2017 |
| CN | 107389026 A | 11/2017 |
| CN | 107728175 A | 2/2018 |
| CN | 107730551 A | 2/2018 |
| CN | 107843251 A | 3/2018 |
| JP | 2009129001 A | 6/2009 |
| JP | 2016006627 A | 1/2016 |
| JP | 2018028864 A | 2/2018 |

OTHER PUBLICATIONS

Michael Miksch et al: "Automatic extrinsic camera self-calibration based on homography and epipolar geometry", Intelligent Vehicles Symposium (4), 2010 IEEE, IEEE, Piscataway, NJ, USA, Jun. 21, 2010 (Jun. 21, 2010), pp. 832-839, XP031732209, ISBN: 978-1-4244-7866-8 abstract Section 2, 3.
International Search Report in the international application No. PCT/CN2019/088207, dated Aug. 21, 2019.
Supplementary European Search Report in the European application No. 19814687.0, dated May 14, 2020.
Computer Engineering and Applications, "Improved relative pose algorithm based on homography matrix", Peike Zhang, Yuanxin Wu, Qi Cai, issued on Aug. 1, 2017.
Acta Automatica Sinica, "Drivable Road Boundary Detection for Intelligent Vehicles based on Stereovision with Plane-Induced Homography", Chun-Zhao Guo Takayuki YamabeSeiichi Mita, issued on Apr. 30, 2013.
English translation of the Written Opinion of the International Search Authority in the international application No. PCT/CN2019/088207, dated Aug. 21, 2019.
First Office Action of the Japanese application No. 2019-572133, dated Aug. 18, 2020.

* cited by examiner

US 11,069,088 B2

VISUAL POSITIONING METHOD AND APPARATUS, ELECTRONIC DEVICE, AND SYSTEM

CROSS-REFERENCE TO RELATED APPLICATIONS

The present application is a national stage of International Application No. PCT/CN2019/088207 filed on May 23, 2019, which claims priority to Chinese Patent Application No. 201810581686.6, filed on Jun. 5, 2018. The disclosures of these applications are hereby incorporated by reference in their entirety.

TECHNICAL FIELD

The present disclosure relates to computer vision technologies, and in particular, to a visual positioning method and apparatus, an electronic device, and a system.

BACKGROUND

An unmanned driving system or an Advanced Driver Assistant System (ADAS) is a system applied to the field of intelligent driving, and target positioning is a core function of the system. Only a common monocular camera is used in a monocular visual positioning method, and the method has the advantages of a simple algorithm, high efficiency, and a small amount of computation, and therefore, the method becomes the hotspot of research.

The implementation of monocular visual positioning is mainly based on the parameters of the camera. The parameters of the camera are related to the factors, such as the pose of the camera. Generally, the parameters of the camera are pre-calibrated. Positioning is performed based on the parameters of the camera after the parameters of the camera are calibrated.

SUMMARY

Embodiments of the present disclosure provide solutions for visual positioning.

In a first aspect, the embodiments of the present disclosure provide a visual positioning method, including: detecting a lane line of a road surface on which a vehicle travels based on a video stream of the road surface that is collected by a camera mounted on a vehicle; determining first reference point information at a current angle of view of the camera according to a detection result of the lane line; determining a third homography matrix according to the first reference point information and second reference point information, where the second reference point information is reference point information at a previous angle of view of the camera, the position of a second reference point corresponds to that of a first reference point, and the third homography matrix is used for representing a mapping relationship between a coordinate of the camera at a current angle of view and a coordinate of the camera at the previous angle of view; determining a first homography matrix according to the third homography matrix and a predetermined homography matrix, where the predetermined homography matrix indicates a mapping relationship between the coordinate of the camera at the previous angle of view and a world coordinate at the previous angle of view; and performing positioning according to the first homography matrix.

In a second aspect, the embodiments of the present disclosure provide a visual positioning apparatus, including: a detecting module, configured to detect a lane line of a road surface on which a vehicle travels based on a video stream of the road surface that is collected by a camera mounted on a vehicle;
a first determining module, configured to determine first reference point information at a current angle of view of the camera according to a detection result of the lane line;
a second determining module, configured to determine a third homography matrix according to the first reference point information and second reference point information, where the second reference point information is reference point information at a previous angle of view of the camera, the position of a second reference point corresponds to that of a first reference point, and the third homography matrix is used for representing a mapping relationship between a coordinate of the camera at a current angle of view and a coordinate of the camera at the previous angle of view;
a third determining module, configured to determine a first homography matrix according to the third homography matrix and a predetermined homography matrix, where the predetermined homography matrix indicates a mapping relationship between the coordinate of the camera at the previous angle of view and a world coordinate at the previous angle of view; and a positioning module, configured to perform positioning according to the first homography matrix.

A third aspect of the present disclosure provides an electronic device, including:
a memory, configured to store program instructions; and
a processor, configured to invoke and execute the program instructions in the memory to execute the operations of the method in the first aspect.

A fourth aspect of the embodiments of the present disclosure provides a readable storage medium, where the readable storage medium stores a computer program, where the computer program is configured to execute the operations of the method in the first aspect.

A fifth aspect of the embodiments of the present disclosure provides a visual positioning system, applied to a vehicle, where the system includes a camera mounted on the vehicle and the visual positioning apparatus in the second aspect that is communicationally connected to the camera.

A sixth aspect of the present disclosure provides a computer program, where the computer program enables a computer to execute the method in the first aspect.

By means of the visual positioning method and apparatus, the electronic device, and the system provided by the present disclosure, the first homography matrix from the coordinate of the camera at the current angle of view to the world coordinate that is capable of reflecting the real-time pose of the camera is generated based on the first reference point information at the current angle of view and the second reference point information at the previous angle of view, and then visual positioning is performed based on the first homography matrix, and thus after the pose of the camera is changed, visual positioning can be normally performed without manually measuring parameters by a user, thereby reducing the operation complexity, and greatly improving the use experience of the user.

BRIEF DESCRIPTION OF DRAWINGS

To describe the technical solutions in the present disclosure or the prior art more clearly, the accompanying drawings required for describing the embodiments or the prior art are briefly introduced below. Apparently, the accompanying drawings in the following description show some embodiments of the present disclosure, and a person of ordinary skill in the art can still derive other accompanying drawings from these accompanying drawings without an inventive effort.

DETAILED DESCRIPTION

To describe the purpose, the technical solutions and the advantages of the present disclosure more clearly, the technical solutions in the embodiments of the present disclosure are described more clearly and completely by combining the accompanying drawings in the embodiments of the present disclosure. Apparently, the described embodiments are some of the embodiments of the present disclosure, but not all the embodiments. Based on the embodiments of the present disclosure, all other embodiments obtained by a person of ordinary skill in the art without involving an inventive effort shall fall within the scope of protection of the present disclosure.

It should be noted that the camera in the embodiments of the present disclosure is a vehicle-mounted camera applied to visual positioning, and road surface information can be photographed by means of the vehicle-mounted camera.

In the related art, in the scenario that the pose of the camera is changed, for example, the camera is remounted or mounted on other vehicles, or the road is bumpy, generally, the user needs to manually perform parameter measurement, and the parameters that need to be measured include the extrinsic parameters of the camera, such as the pitch angle of the camera. Therefore, the user needs to perform multiple complex operations, and then parameter information can be measured, resulting in poor user experience.

By means of the visual positioning method provided by the embodiments of the present disclosure, the first homography matrix from the coordinate of the camera at the current angle of view to the world coordinate that is capable of reflecting the real-time pose of the camera is generated by virtue of the reference point at the current angle of view and the reference point at the previous angle of view, and then visual positioning is performed based on the first homography matrix, and thus after the pose of the camera is changed, visual positioning can be normally performed without manually measuring parameters by a user, thereby reducing the operation complexity, and greatly improving the use experience of the user.

To make persons skilled in the art better understand the technical solutions of the embodiments of the present disclosure, the terminologies involved in the embodiments of the present disclosure are explained first below.

1. Current Angle of View and Previous Angle of View

Figure 1:
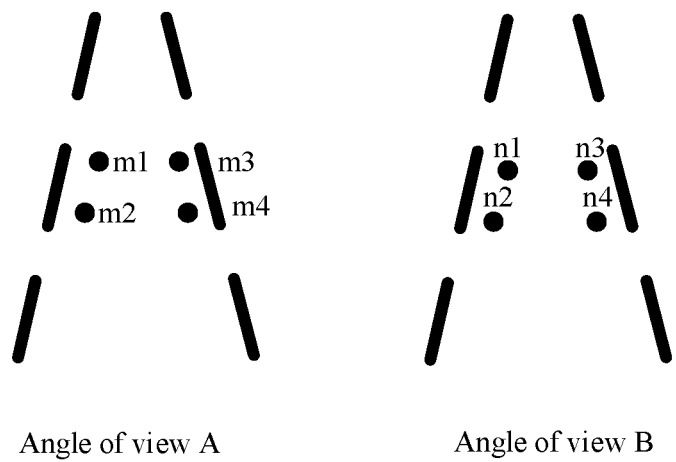
FIG. 1 is a schematic diagram of a current angle of view and a previous angle of view in embodiments of the present disclosure.

The current angle of view is the angle of view of the camera at current moment, and the previous angle of view is the angle of view of the camera at a certain moment before the current moment. Regarding the scenario to which the embodiments of the present disclosure are applied, the current angle of view and the previous angle of view may be a same angle of view or different angle of views. For example, as shown in FIG. 1, angle of view A is the previous angle of view, and becomes a current angle of view, i.e., angle of view B, after the pose of the camera is changed.

(2) Homography Matrix

The homography matrix is applied to transformation of coordinates at angle of views on a same plane at different moments, i.e., used for identifying a mapping relationship between coordinates at angle of views at different moments.

Figure 2:
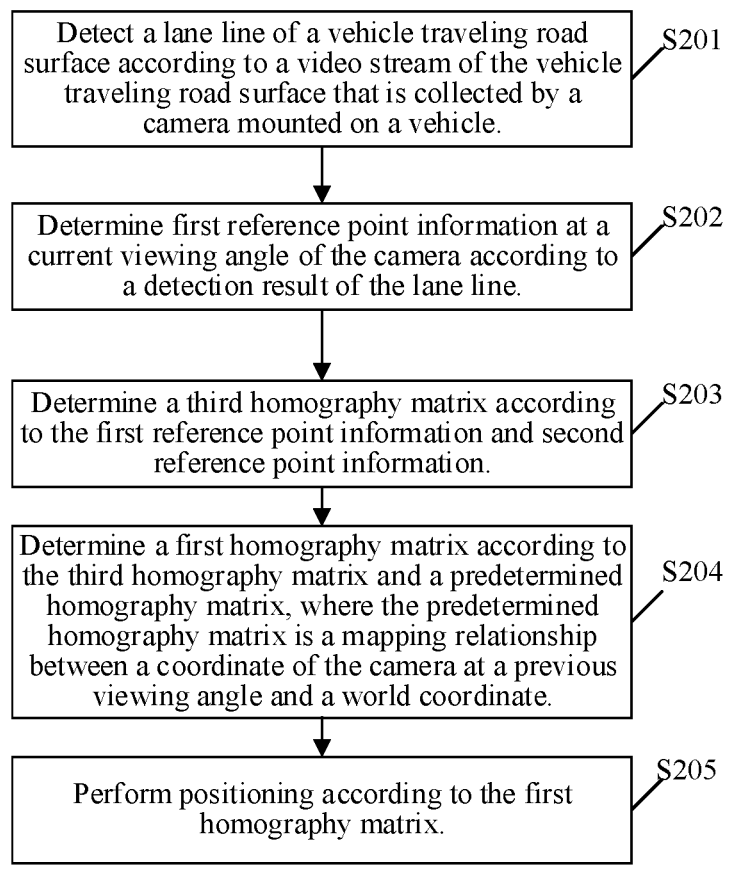
FIG. 2 is a schematic flowchart of a visual positioning method embodiment provided by embodiments of the present disclosure.

FIG. 2 is a schematic flowchart of a visual positioning method embodiment provided by embodiments of the present disclosure. The method may be applied to any device that needs visual positioning, i.e., the execution subject of the method may be a device that needs to perform visual positioning. For example, the execution subject may be, but is not limited to, an electronic device including a processor and a memory (the processor invokes corresponding instructions stored in the memory to execute the operations of the method in the embodiments of the present disclosure), or an electronic device including a visual positioning apparatus (the visual positioning apparatus at least includes a detecting module, a first determining module, a second determining module, and a positioning module, and the visual positioning apparatus can execute the operations of the method in the embodiments of the present disclosure), or a vehicle or robot having an ADAS mounted thereon, or an unmanned vehicle or robot. The description for the execution subject of the method is also applicable to other method embodiments of the present disclosure. Details are not described repeatedly. As shown in FIG. 2, the method includes the following operations.

At S201, a lane line of a road surface on which a vehicle travels is detected based on a video stream of the road surface that is collected by a camera mounted on the vehicle.

At S202, first reference point information at a current angle of view of the camera is determined according to a detection result of the lane line.

The camera mounted on the vehicle is turned on in advance; the camera collects the video stream of the vehicle traveling road surface in real time; and the device performing visual positioning detects the lane line according to the video stream collected by the camera to obtain a detection result of the lane line.

According to one or more embodiments of the present disclosure, lane line information can be determined according to the detection result of the lane line.

According to one or more embodiments of the present disclosure, the lane line information may be information of two lane lines at left and right edges of the vehicle, or information of parallel lines of the two lane lines. The two lane lines may be straight lane lines, and may also be curved lane lines, and no limitation is made thereto in the embodiments of the present disclosure. If the lane lines are curved lane lines, statistical processing on the curved lane lines can be performed so as to obtain corresponding straight lane line information or straight lane line parallel line information. The lane lines may be solid lines or dotted lines, and the embodiments of the present disclosure do not limit the type of the lane lines. The color of the lane lines may be white, yellow, or black, and the embodiments of the present disclosure do not limit the color of the lane lines.

The lane line information can be represented by a lane line parallel line function. The obtaining process of the lane line information is described in the following embodiments.

At S203, a third homography matrix is determined according to the first reference point information and second reference point information, where the second reference point information is reference point information at a previous angle of view of the camera, the position of a second reference point corresponds to that of a first reference point, and the third homography matrix is used for representing a mapping relationship between a coordinate of the camera at a current angle of view and a coordinate of the camera at the previous angle of view.

At S204, a first homography matrix is determined according to the third homography matrix and a predetermined homography matrix, where the predetermined homography matrix is a mapping relationship between the coordinate of the camera at the previous angle of view and a world coordinate at the previous angle of view.

According to one or more embodiments of the present disclosure, the second reference point is a known reference point, i.e., the reference point at the previous angle of view has been selected and recorded before the embodiments are executed. The first reference point and the second reference point are both coordinate points in the world coordinate, and are both vertical equidistant paired site coordinates of the parallel line of the lane line. The position of the second reference point corresponds to that of the first reference point, and specifically it may be indicated that the first reference point and the second reference point are both the vertical equidistant paired sites on the parallel line of the lane line. FIG. 1 is taken as an example. The angle of view A in FIG. 1 is the previous angle of view, and m1, m2, m3, and m4 at the angle of view A are second reference points, where m1 and m3 are a pair of sites, and m2 and m4 are a pair of sites. The angle of view B in FIG. 1 is the current angle of view, and n1, n2, n3, and n4 at the angle of view B are first reference points, where n1 and n3 are a pair of sites, and n2 and n4 are a pair of sites.

For example, it is assumed that the previous angle of view is the angle of view A in FIG. 1, and the current angle of view is the angle of view B in FIG. 1, and then the mapping relationship between the coordinate of the camera and the world coordinate at the angle of view A can be obtained and recorded in advance. Further, at this step, the mapping relationship of the coordinate of the camera from the angle of view B to the angle of view A can be obtained according to the first reference point and the second reference point. Then, the mapping relationship from the angle of view B to the angle of view A and the mapping relationship from the angle of view A to the world coordinate are integrated so as to obtain the mapping relationship from the angle of view B to the world coordinate.

Description is performed by giving one example below.

It is assumed that the second reference point at the angle of view A is $M=\{m1, m2, \ldots, m6, \ldots\}$, the first reference point at the angle of view B is $N=\{n1, n2, \ldots, n3, \ldots\}$, and the predetermined homography matrix from the coordinate of the camera at the angle of view A to the world coordinate is $$H_1 = \begin{bmatrix} m_{11} & m_{12} & m_{13} \\ m_{21} & m_{22} & m_{23} \\ m_{31} & m_{32} & m_{33} \end{bmatrix},$$

and then first by means of a corresponding relationship of a coordinate point set M-N, the homography matrix $$H_3 = \begin{bmatrix} n_{11} & n_{12} & n_{13} \\ n_{21} & n_{22} & n_{23} \\ n_{31} & n_{32} & n_{33} \end{bmatrix}$$

from the angle of view B to the angle of view A is obtained by using a findHomography function in opencv, and further, H3 and H1 are multiplied by each other so as to obtain the first homography matrix HT that specifically is $$H_T = H_1 \cdot H_3 = \begin{bmatrix} h_{11} & h_{12} & h_{13} \\ h_{21} & h_{22} & h_{23} \\ h_{31} & h_{32} & h_{33} \end{bmatrix}.$$

At S205, positioning is performed according to the first homography matrix.

In the present embodiments, the first homography matrix from the coordinate of the camera at the current angle of view to the world coordinate that is capable of reflecting the real-time pose of the camera is generated based on the first reference point information at the current angle of view and the second reference point information at the previous angle of view, and then visual positioning is performed based on the first homography matrix, and thus after the pose of the camera is changed, visual positioning can be normally performed without manually measuring parameters by a user, thereby reducing the operation complexity, and greatly improving the use experience of the user.

In one optional embodiment of the present disclosure, after the first homography matrix is determined, the predetermined homography matrix can be updated, the first homography matrix is used as a new predetermined homography matrix, and visual positioning is performed according to the new predetermined homography matrix.

On the basis of the aforementioned embodiments, the present embodiments relate to a specific process of performing positioning according to the first homography matrix. According to one or more embodiments of the present disclosure, the first homography matrix can be directly used to perform positioning. Specifically, first the coordinate of the camera at the current angle of view can be obtained according to the video stream collected by the camera, and then the coordinate of the camera is multiplied by the first homography matrix so as to obtain the world coordinate at the current angle of view.

It should be noted that during specific implementation, the position of the camera can be regarded as a coordinate origin at the current angle of view, and then after the world coordinate at the current angle of view is obtained, the position of a target object relative to the camera is obtained, and thus, visual positioning is finished. The principle of obtaining the world coordinate at the current angle of view according to the first homography matrix in the following embodiments of the present disclosure is the same as this. Details are not described repeatedly.

In the real world, the widths of the lane lines on different road surfaces are not necessarily identical, and thus if the first homography matrix is directly used to perform positioning, the obtained vertical distance and horizontal distance both may be offset from actual distances. Therefore, in the embodiments of the present disclosure, another optional implementation mode can also be used, i.e., the first homography matrix is calibrated and positioning is performed according to the calibrated first homography matrix so as to ensure that a positioning result is more accurate.

In the optional implementation mode, the performing positioning according to the first homography matrix includes: calibrating the first homography matrix according to vertical calibration information and horizontal calibration information so as to obtain a calibration parameter; and performing positioning according to the calibration parameter and the first homography matrix.

According to one or more embodiments of the present disclosure, the position of the target object is decided by the vertical coordinate and horizontal coordinate of the target object in the world coordinate. Illustratively, it is assumed that the horizontal coordinate of a certain target object relative to the camera is 3 and the vertical coordinate is 4, and then the position of the target object can be uniquely determined by means of the coordinate 3 and the coordinate 4. Accordingly, the deviation of the first homography matrix consists of a horizontal deviation and a vertical deviation. Therefore, in the present embodiments, the first homography matrix is calibrated according to the vertical calibration information and the horizontal calibration information so as to obtain the calibration parameter, and positioning is performed according to the calibration parameter and the first homography matrix.

The vertical calibration information may include the pitch angle and the like, and the horizontal calibration information may include a horizontal declination angle and the like.

A specific execution process is described by taking examples in the following embodiments.

The application scenarios of the embodiments of the present disclosure are described below. The solutions involved in the embodiments of the present disclosure can be applied to an intelligent driving scenario, such as an assisted driving or automatic driving scenario. The unmanned driving system or the ADAS system is a system applied to the field of intelligent driving. The embodiments of the present disclosure describe the application process of the method of the embodiments of the present disclosure in an intelligent driving scenario by taking the ADAS system as an example below. However, apparently, no limitation is made thereto in the embodiments of the present disclosure.

In one scenario, if a calibration instruction that is manually inputted by the user or inputted by the ADAS system under a special trigger condition is received, the execution of operation S201 can be triggered, and then the steps subsequent to operation S201 are executed. Therefore, as one implementation mode, the determining first reference point information at a current angle of view of the camera according to a detection result of the lane line in step 202 includes: receiving a calibration instruction, and based on the calibration instruction, determining first reference point information at a current angle of view of the camera according to a detection result of the lane line.

Illustratively, if the user manually adjusts the mounting position of the camera, the user can input a calibration instruction on an ADAS system interface by clicking on a button or by means of voice; after receiving the calibration instruction inputted by the user, the system executes operation S201 and the operations subsequent thereto, thereby achieving precise positioning after the mounting position of the camera is changed.

In another scenario, the user does not need to send a calibration instruction, the ADAS system can determine whether the pose of the camera is changed, and if yes, the execution of operation S201 and subsequent steps is triggered. As another implementation mode, the determining first reference point information at a current angle of view of the camera according to a detection result of the lane line in operation 202 includes: determining whether the pose of the camera is changed, and if yes, determining first reference point information at a current angle of view of the camera according to a detection result of the lane line.

Illustratively, the ADAS system can estimate the pose of the camera in real time, and according to results of two adjacent pose estimations, determines whether the pose of the camera is changed. If the pose of the camera is changed, the ADAS system executes operation S201 and the operations subsequent thereto, thereby achieving precise positioning after the mounting position of the camera is changed.

According to one or more embodiments of the present disclosure, the method further includes: obtaining multiple first homography matrixes and multiple groups of calibration parameters within a first predetermined period; and performing new positioning according to an average value of the multiple first homography matrixes and an average value of the multiple groups of calibration parameters.

Illustratively, the ADAS system can further execute the following operations: it is assumed that the first predetermined period is 10 seconds; the ADAS system obtains 8 groups of data within the 10 seconds, i.e., 8 first homography matrixes and 8 groups of calibration parameters, and then at a time point after the first predetermined period, the ADAS system can directly use the average value of the 8 groups of data to perform new positioning. That is, a homography matrix obtained by averaging the 8 first homography matrixes is used as a new homography matrix, a calibration parameter obtained by averaging the 8 groups of calibration parameters is used as a new calibration parameter, and positioning is performed according to the new homography matrix and the new calibration parameter.

According to one or more embodiments of the present disclosure, the method further includes: obtaining the first homography matrix and the calibration parameter according to a second predetermined periodic interval; and performing new positioning according to the first homography matrix and the calibration parameter.

Illustratively, the ADAS system can further execute the following operations: it is assumed that a second predetermined period is 5 seconds, and then the ADAS system obtains the first homography matrix and the calibration parameter every 5 seconds, and further performs positioning within a next period of 5 seconds by using the first homography matrix and the calibration parameter obtained within the previous period.

Figure 3:
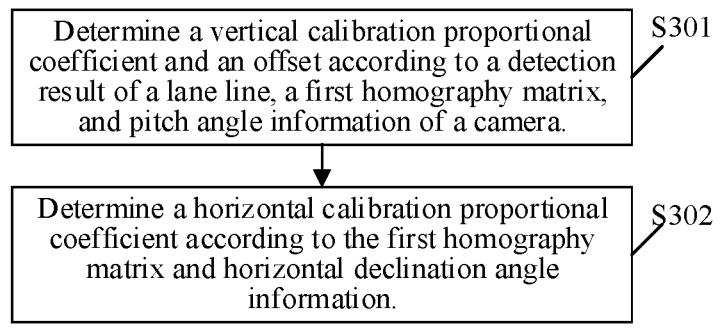
FIG. 3 is a schematic flowchart of a visual positioning method embodiment provided by embodiments of the present disclosure.

On the basis of the aforementioned embodiments, the present embodiments relate to a specific execution process of calibrating the first homography matrix to obtain a calibration parameter. FIG. 3 is a schematic flowchart of a visual positioning method embodiment provided by embodiments of the present disclosure. As shown in FIG. 3, the calibrating the first homography matrix to obtain a calibration parameter specifically may include:

S301, determining a vertical calibration proportional coefficient and an offset according to the detection result of the lane line, the first homography matrix, and pitch angle information of the camera; and S302, determining a horizontal calibration proportional coefficient according to the first homography matrix and horizontal declination angle information.

According to one or more embodiments of the present disclosure, it is needed to first determine the pitch angle information and the horizontal declination angle information before executing the present embodiment.

According to one or more embodiments of the present disclosure, before the calibrating the first homography matrix to obtain a calibration parameter, the method further includes: determining the pitch angle information and horizontal declination angle information of the camera according to the detection result of the lane line.

According to one or more embodiments of the present disclosure, horizon information and route information can be determined according to the detection result of the lane line. The horizon information may be a horizon function, and the route information may be a route function.

It should be understood that the specific mathematical representation forms of the functions involved in the embodiments of the present disclosure are only examples. On the basis of the present disclosure, persons skilled in the art can construct the functions in other mathematical representation forms. The examples provided by the present disclosure do not substantively limit the technical solutions of the present disclosure.

First, a function distance (PQ in the following FIG. 4) from the pixel coordinate of a main optical axis to a horizon is calculated according to the horizon function, and then the pitch angle θ is calculated by means of the following formula (1):

$$\theta = \arctan(PQ/(f*pm)) \quad (1)$$

Then, a function distance (CD in the following FIG. 5) from the pixel coordinate of the main optical axis to a route is calculated according to the route function, and then the horizontal declination angle Φ is calculated by means of the following formula (2):

$$\varphi = \arctan(CD/(f*pm)) \quad (2)$$

According to one or more embodiments of the present disclosure, an acceleration can further be obtained by using hardware, such as a gyroscope, and the pitch angle information and the horizontal declination angle information are obtained according to the change of the acceleration.

Furthermore, in the present embodiment, a vertical calibration parameter and a horizontal calibration parameter are separately obtained, where the vertical calibration parameter specifically includes the vertical calibration proportional coefficient and the offset, and the horizontal calibration parameter specifically is the horizontal calibration proportional coefficient.

According to one or more embodiments of the present disclosure, the obtaining process of the vertical calibration parameter is as follows.

Figure 4:
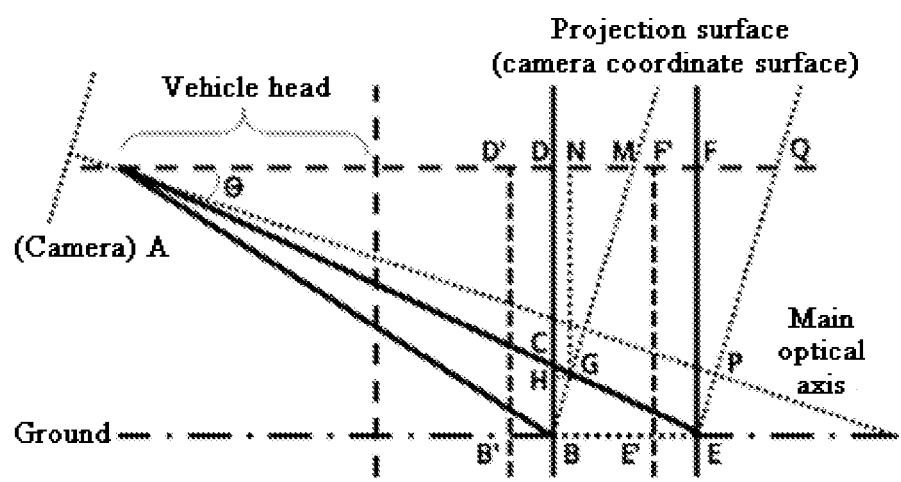
FIG. 4 is a vertical calibration geometric model provided by embodiments of the present disclosure.

First, the vertical calibration geometric model as shown in FIG. 4 is established. In the model, A is a vertical coordinate origin in a world coordinate system, and B and E respectively represent the same point on the ground in the current frame and the previous frame. Therefore, BE represents the actual displacement of the vehicle (the camera), B'E' represents the displacement in the world coordinate calculated by using the first homography matrix, BD', BD, GN, E'F', and EF are all vertical to the ground, GH is parallel to the ground, and the dotted line on which D', D, N, M, F', F, and Q are located represents a parallel line of the ground having the same height as the camera. To facilitate description, in the present embodiment, a straight line on which B, G, and M are located is defined as the projection surface of the camera. Therefore, point G is the position of point E on the previous frame of picture. It can be obtained according to a perspective principle that GM and BM respectively represent pixel distances from the same point on the ground in the real world in the picture to the horizon.

On the basis of the geometric model shown in FIG. 4, first, the actual displacement BE of a current inter-frame vehicle is calculated according to the current frame rate of the camera and a vehicle speed. The current frame rate of the camera and the vehicle speed need to be obtained in advance. Furthermore, the same point (for example, a corner point of the lane line) in a video is tracked so as to obtain the pixel coordinates of B and G on the picture. According to one or more embodiments of the present disclosure, the same point in the video can be tracked by means of optical flow tracking. Furthermore, B', E', and the world coordinates F' and D' are calculated according to the first homography matrix so as to obtain AF' and AD'. Meanwhile, according to the horizon function (a specific obtaining manner is described in the following embodiments), the function distances from B and G pixel coordinates to the horizon are calculated by using the following distance formula (3) between a point and a straight line, i.e., GM and BM are obtained. Furthermore, BG is calculated by using formula (4).

$$d = \left| \frac{Ar_9 + By_0 + C}{\sqrt{A^2 + B^2}} \right| \quad (3)$$

$$BG = BM - GM \quad (4)$$

Furthermore, the vertical calibration proportional coefficient k is calculated by using the following formula (5).

$$k = \frac{BE}{AF' - AD'} \quad (5)$$

The offset b is calculated by using the following formula (6).

$$b = D'D = BE * \left[ \left( \frac{X'_2}{X'_1} + 1 \right) * \cos^2\theta - 1 \right] - k*AD' \qquad (6)$$

Figure 5:
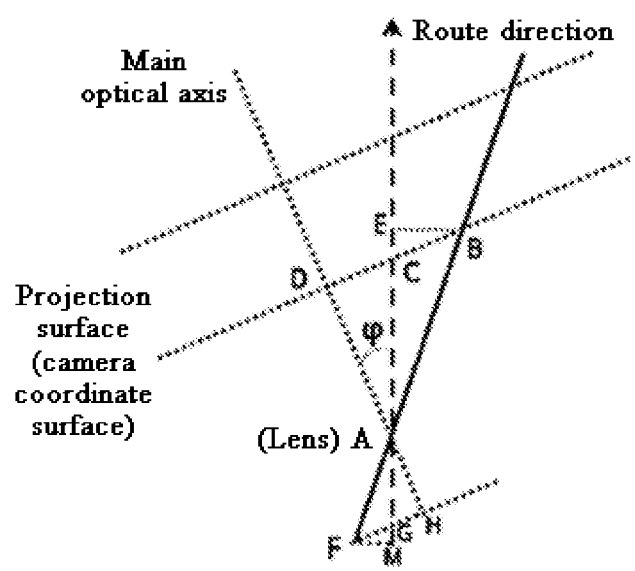
FIG. 5 is a horizontal calibration geometric model provided by embodiments of the present disclosure.

The obtaining process of the horizontal calibration parameter is as follows. First, the horizontal calibration geometric model as shown in FIG. 5 is established. In the model, A is a coordinate origin in the world coordinate system, and B is any point on the ground in a certain frame of picture. Therefore, BE is a horizontal distance in the world coordinate system. To facilitate description, in the present embodiment, the straight line on which D, C, and B are located is defined as the projection surface of the camera. Therefore, BC is a distance from B point in the pixel coordinate to the route function (the specific obtaining manner is described in the following embodiments). AH is the focal length of the camera, and FH is the length of the imaging surface of the camera in the real world. AH and FH need to be obtained in advance.

On the basis of the geometric model shown in FIG. 5, first, BC is calculated by means of the distance formula (3) between a point and a straight line. Furthermore, according to the obtained vertical calibration proportional coefficient k and offset b, AE is calculated by using the following formula (7). Further, the world coordinate of B is calculated according to the first homography matrix so as to obtain BE'. Therefore, according to an intrinsic parameters of the camera and the horizontal declination angle, the horizontal calibration proportional coefficient k' is calculated by using the following formula (8).

$$AE = k*AE' + b \qquad (7)$$

$$k' = \frac{BC*AE*(\cos 2\varphi + 1)}{2*pm*f + BC*\sin 2\varphi} * \frac{1}{BE'} \qquad (8)$$

Figure 6:
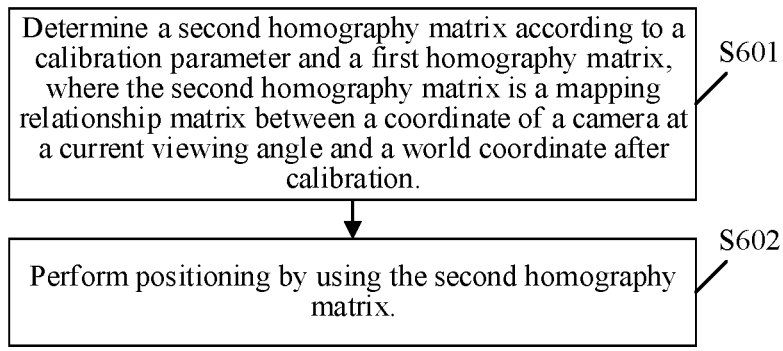
FIG. 6 is a schematic flowchart of a visual positioning method embodiment provided by embodiments of the present disclosure.

According to one or more embodiments of the present disclosure, the coordinates of the same target object in multiple frames of images collected by the camera at the current angle of view can further be compared and analyzed, so that the vertical calibration proportional coefficient, the offset, and the horizontal calibration proportional coefficient are determined. On the basis of the aforementioned embodiments, the present embodiments relate to the specific process of performing positioning according to the calibration parameter and the first homography matrix. FIG. 6 is a schematic flowchart of a visual positioning method embodiment provided by embodiments of the present disclosure. As shown in FIG. 6, one optional implementation mode of performing positioning according to the calibration parameter and the first homography matrix is: at S601, determining a second homography matrix according to the calibration parameter and the first homography matrix, where the second homography matrix is obtained by calibrating a mapping relationship matrix between the coordinate of the camera and the world coordinate at the current angle of view.

For example, the first homography matrix and the calibration parameter are integrated so as to form the second homography matrix. According to one or more embodiments of the present disclosure, the determining a second homography matrix according to the calibration parameter and the first homography matrix includes: determining at least one sub-parameter of the calibration parameter according to a first predetermined amount of coordinate points in a picture of the video stream collected by the camera, and determining the second homography matrix according to the at least one sub-parameter. The at least one sub-parameter is a parameter obtained after the calibration parameter is split.

According to one or more embodiments of the present disclosure, the sub-parameter is the sub-parameter of the offset b.

Illustratively, it is assumed that the sub-parameters of the offset b are b1, b2, and b3, then any 3 coordinate points (respectively being (x1, y1, 1), (x2, y2, 1), and (x3, y3, 1)) can be selected, and the sub-parameters b1, b2, and b3 are calculated by means of the following equation (9).

$$[b_1 \ b_2 \ b_3] \begin{bmatrix} x_1 & x_2 & x_3 \\ y_1 & y_2 & y_3 \\ 1 & 1 & 1 \end{bmatrix} = [k*y_{T1}+b \ k*y_{T2}+b \ k*y_{T3}+b] \qquad (9)$$

Furthermore, the sub-parameters b1, b2, and b3, the vertical calibration proportional coefficient k, and the horizontal calibration proportional coefficient k' are merged into the first homography matrix so as to form the second homography matrix.

Description is performed by giving one example below.
It is assumed that one coordinate point $$x = \begin{bmatrix} x \\ y \\ 1 \end{bmatrix}$$

exists in an image and the first homography matrix is $H_T$, then only after mapping by the first homography matrix, the obtained world coordinate of the coordinate point X is $$Y_T = H_T * X = \begin{bmatrix} h_{11} & h_{12} & h_{13} \\ h_{21} & h_{22} & h_{23} \\ h_{31} & h_{32} & h_{33} \end{bmatrix} \begin{bmatrix} x \\ y \\ 1 \end{bmatrix} = \begin{bmatrix} x_T \\ y_T \\ 1 \end{bmatrix},$$

and the real world coordinate corresponding to the coordinate point X should be $$Y = \begin{bmatrix} k'*x_T \\ k*y_T + b \\ 1 \end{bmatrix}.$$

Therefore, by means of a matrix operation, after the sub-parameters b1, b2, and b3, the vertical calibration proportional coefficient k, and the horizontal calibration proportional coefficient k' are merged into the first homography matrix HT, the obtained second homography matrix is $$H = \begin{bmatrix} k'h_{11} & k'h_{12} & k'h_{13} \\ kh_{21}+b_1 & kh_{22}+b_2 & kh_{23}+b_3 \\ h_{31} & h_{32} & h_{33} \end{bmatrix}.$$

At S602, positioning is performed by using the second homography matrix.

In the present embodiment, the first homography matrix and the calibration parameter are integrated to form the calibrated homography matrix, so that during visual positioning, visual positioning can be quickly finished by using the calibrated homography matrix, thus improving the efficiency of visual positioning.

Figure 7:
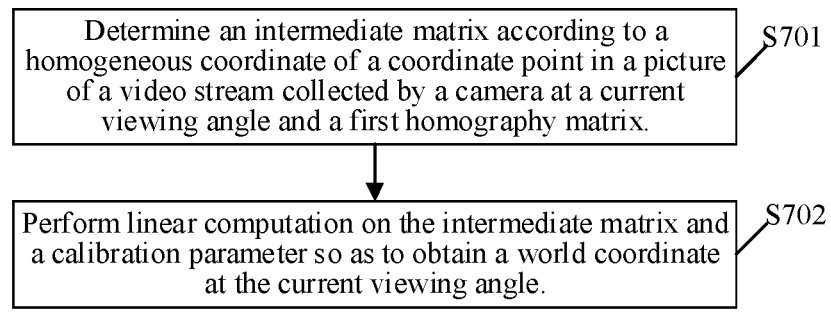
FIG. 7 is a schematic flowchart of a visual positioning method embodiment provided by embodiments of the present disclosure.

FIG. 7 is a schematic flowchart of a visual positioning method embodiment provided by embodiments of the present disclosure. As shown in FIG. 7, another optional implementation mode of performing positioning according to the calibration parameter and the first homography matrix is:at S701, determining an intermediate matrix according to a homogeneous coordinate of a coordinate point in the picture of the video stream collected by the camera at the current angle of view and the first homography matrix.

According to one or more embodiments of the present disclosure, a homogeneous coordinate of a coordinate point in the picture of the video stream collected by the camera at the current angle of view is multiplied by the first homography matrix so as to obtain the intermediate matrix.

At S702, linear computation is performed on the intermediate matrix and the calibration parameter so as to obtain the world coordinate at the current angle of view.

The coordinate point of the camera may be any coordinate point in the picture collected by the camera. It is assumed that a certain coordinate point X is (x, y), and then a homogeneous coordinate of a coordinate point X is $$x = \begin{bmatrix} x \\ y \\ 1 \end{bmatrix}.$$

That is, in the present embodiment, for any one coordinate point in the picture collected by the camera, the world coordinate of the coordinate point at the current angle of view can be directly obtained by directly multiplying the homogeneous coordinate matrix of the coordinate point by the first homography matrix, and performing linear computation on the homogeneous coordinate matrix and the calibration parameter.

In the present embodiment, the first homography matrix and the calibration parameter are not integrated, but if it is needed to perform visual positioning, the first homography matrix and the calibration parameter are directly used. If the first homography matrix and the calibration parameter are continuously changed, the computation amount can be reduced by using the method of the present embodiment, and the computation efficiency is improved.

On the basis of the aforementioned embodiments, the present embodiments relate to the specific method of determining the first reference point information according to the detection result of the lane line.

Before the first reference point is determined, it is needed to first determine the information of the parallel line of the lane line, the horizon information, vanishing point information, and the route information according to the detection result of the lane line.

The route information refers to the traveling route of the vehicle and extension route information of the route, and a vanishing point is a road surface vanishing point.

According to one or more embodiments of the present disclosure, first, the parallel line functions of the lane lines at left and right edges of the vehicle can be fitted in real time, then statistics about the fitted parallel line function of the intersection point of the lane lines and the vanishing point are collected, and further the route function is calculated according to the horizon and the vanishing point.

For example, for the fitting of the parallel line function of the lane line, first a pixel point at which the lane line is located can be marked by means of a deep learning splitting method, and further curved function fitting is performed on the two lane lines at the left and right edges of the current vehicle by means of opencv. Meanwhile, because the road mostly is straight, the probability map of the parallel line of a straight lane line can be obtained according to a statistical method, and further based on the probability map, the linear function of the parallel line of the straight lane line at the left and right edges of the vehicle is fitted. Alternatively, the parallel line function of the lane line can also be fitted by means of a piecewise function and the like.

For the horizon function and the vanishing point, first the intersection point within an image coordinate range is calculated according to the lane line parallel line functions fitted in real time. Further, after the vehicle normally travels for a period of time, because there are road conditions such as lane merging and curved lane, the probability map of the intersection point of the lane line can be obtained. According to the probability map, an outlier is removed by using a density-based clustering algorithm (such as a DBSCAN algorithm), so that a series of points on the horizon can be obtained. The parallel line function of the horizon can be fitted by using these points, and the coordinate of the vanishing point is obtained by means of a mean method and the like.

For the route function, it can be known according to the perspective principle that the fitted horizon necessarily is orthogonal to the route, and the route or the extension line thereof necessarily passes through the vanishing point. Therefore, the orthogonal line function of the horizon is calculated by means of the vanishing point and used as the route function. Alternatively, optical flow can also be used to calculate the points with a horizontal motion vector being 0, and then these points are used to fit the route function.

According to one or more embodiments of the present disclosure, first, the parallel line functions of the lane lines at the left and right edges of the vehicle can be fitted in real time, then the route function and the vanishing point are fitted, and further the horizon function is calculated according to the route function and the vanishing point.

After the lane line information, the horizon information, and the route line information are obtained, the first reference point is determined according to such information.

Figure 8:
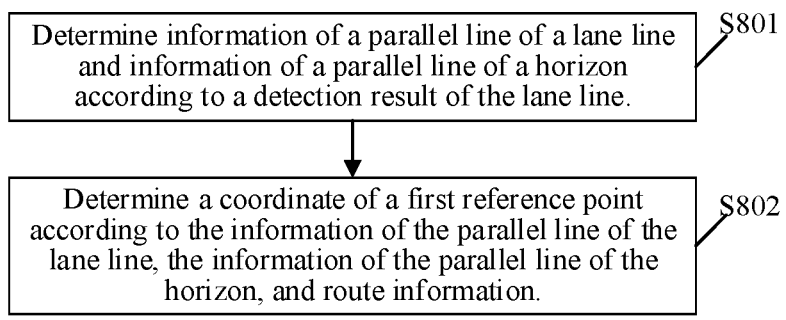
FIG. 8 is a schematic flowchart of a visual positioning method embodiment provided by embodiments of the present disclosure.

FIG. 8 is a schematic flowchart of a visual positioning method embodiment provided by embodiments of the present disclosure. As shown in FIG. 8, the specific process of determining the first reference point according to the detection result of the lane line includes:

at S801, determining information of a parallel line of the lane line and information of a parallel line of a horizon according to the detection result of the lane line.

According to one or more embodiments of the present disclosure, the determining information of a parallel line of the lane line and information of a parallel line of a horizon according to the detection result of the lane line includes: fitting the parallel line of the lane line according to the detection result of the lane line, and determining the information of the parallel line of the horizon according to the fitted parallel line of the lane line.

According to one or more embodiments of the present disclosure, the information of the parallel line of the lane line may be the parallel line function of the lane line, and the information of the parallel line of the horizon may be the parallel line function of the horizon.

At S802, the coordinate of the first reference point is determined according to the information of the parallel line of the lane line, the information of the parallel line of the horizon, and the route information.

According to one or more embodiments of the present disclosure, the determining the coordinate of the first reference point according to the information of the parallel line of the lane line, the information of the parallel line of the horizon, and the route information includes: selecting a second predetermined amount of coordinate points in a route direction, determining the information of the parallel line of the horizon of the second predetermined amount of coordinate points, determining the coordinate of the intersection point between the parallel line of the horizon and the parallel line of the lane line according to the information of the parallel line of the horizon and the information of the parallel line of the lane line, and using the coordinate as the coordinate of the first reference point.

For example, first the second predetermined amount of points are selected in the route direction according to the route function, and further, the parallel line functions of the horizon of these points are calculated, then the coordinate of the intersection point of the parallel line function of the horizon and the parallel line function of the lane line is calculated, and the coordinate of the intersection point is used as the coordinate of the first reference point.

In the aforementioned embodiments of the present disclosure, the camera can be mounted at a first position of the vehicle, and the first position is a position where the lane line on the road surface can be photographed. That is, in the embodiments of the present disclosure, the mounting position of the camera is not limited. It is only needed that the camera can photograph road surface information, i.e., visual positioning can be realized by means of the method of the embodiments of the present disclosure.

In addition, in the aforementioned embodiments of the present disclosure, detecting the lane line of the road surface according to the video stream of the traveling road surface of the vehicle that is collected by the camera mounted on a vehicle includes: if the vehicle is in a traveling state, the lane line of the road surface can be detected according to the video stream of the traveling road surface of the vehicle that is collected by the camera mounted on a vehicle, and further the subsequent operations are executed so as to finishing visual positioning. In addition, the pitch angle in the embodiments of the present disclosure may be any angle within a first predetermined angle range, and the horizontal declination angle in the embodiments of the present disclosure may be any angle within a second predetermined angle range.

Figure 9:
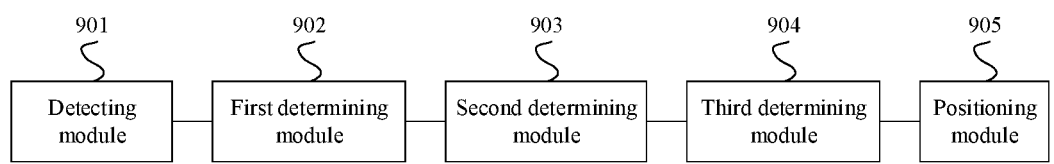
FIG. 9 is a first module structure diagram of a visual positioning apparatus embodiment provided by embodiments of the present disclosure.

FIG. 9 is a first module structure diagram of a visual positioning apparatus embodiment provided by embodiments of the present disclosure. As shown in FIG. 9, the apparatus includes:

a detecting module 901, configured to detect a lane line of a vehicle traveling road surface based on a video stream of the vehicle traveling road surface that is collected by a camera mounted on a vehicle;

a first determining module 902, configured to determine first reference point information at a current angle of view of the camera according to a detection result of the lane line obtained by the detecting module 901;

a second determining module 903, configured to determine a third homography matrix according to the first reference point information determined by the first determining module 902 and second reference point information, where the second reference point information is reference point information at a previous angle of view of the camera, the position of a second reference point corresponds to that of a first reference point, and the third homography matrix is used for representing a mapping relationship between a coordinate of the camera at a current angle of view and a coordinate of the camera at the previous angle of view;

a third determining module 904, configured to determine a first homography matrix according to the third homography matrix determined by the second determining module 903 and a predetermined homography matrix, where the predetermined homography matrix is a mapping relationship between the coordinate of the camera and a world coordinate at the previous angle of view; and a positioning module 905, configured to perform positioning according to the first homography matrix determined by the third determining module 904.

The apparatus is configured to implement the foregoing method embodiments, and the implementation principle and the technical effect thereof are similar. Details are not described herein repeatedly.

According to one or more embodiments of the present disclosure, the positioning module 905 is configured to: calibrate the first homography matrix according to vertical calibration information and horizontal calibration information so as to obtain a calibration parameter; and perform positioning according to the calibration parameter and the first homography matrix.

According to one or more embodiments of the present disclosure, the positioning module 905 includes a first positioning unit configured to: determine a second homography matrix according to the calibration parameter and the first homography matrix, where the second homography matrix is obtained by calibrating a mapping relationship matrix between the coordinate of the camera and the world coordinate at the current angle of view; and perform positioning by using the second homography matrix.

According to one or more embodiments of the present disclosure, the first positioning unit includes a matrix determining unit configured to: determine at least one sub-parameter of the calibration parameter according to a first predetermined amount of coordinate points in a picture of the video stream collected by the camera, where the sub-parameter is a parameter obtained after the calibration parameter is split; and determine the second homography matrix according to the sub-parameter.

According to one or more embodiments of the present disclosure, the positioning module 905 includes a second positioning unit configured to: determine an intermediate matrix according to a homogeneous coordinate of a coordinate point in the picture of the video stream collected by the camera at the current angle of view and the first homography matrix; and perform linear computation on the intermediate matrix and the calibration parameter so as to obtain the world coordinate at the current angle of view.

According to one or more embodiments of the present disclosure, the positioning module 905 further includes a calibrating unit configured to: determine a vertical calibration proportional coefficient and an offset according to the detection result of the lane line, the first homography matrix, and pitch angle information of the camera; and determine a horizontal calibration proportional coefficient according to the first homography matrix and horizontal declination angle information.

Figure 10:
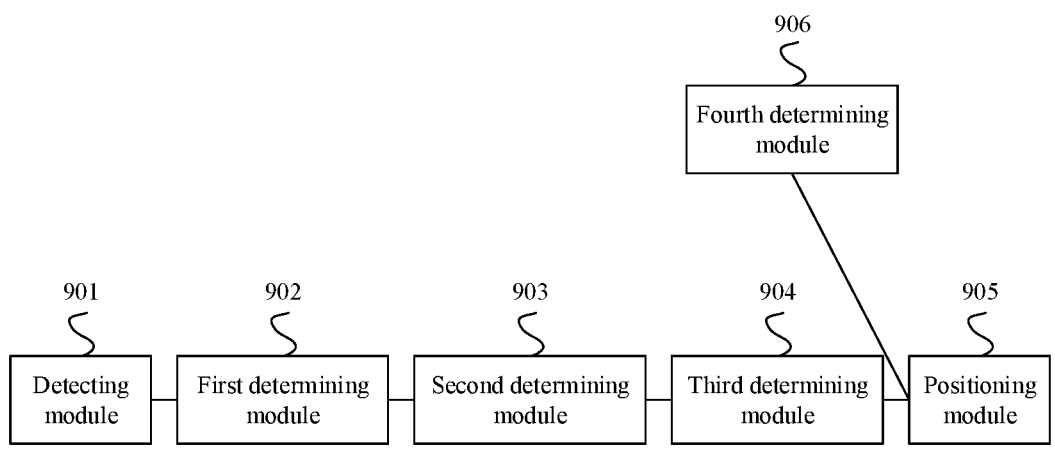
FIG. 10 is a second module structure diagram of a visual positioning apparatus embodiment provided by embodiments of the present disclosure.

FIG. 10 is a second module structure diagram of a visual positioning apparatus embodiment provided by embodiments of the present disclosure. As shown in FIG. 10, the apparatus further includes:

a fourth determining module 906, configured to determine the pitch angle information and the horizontal declination angle information according to the detection result of the lane line.

According to one or more embodiments of the present disclosure, the first determining module 902 is configured to: determine information of a parallel line of the lane line and information of a parallel line of a horizon according to the detection result of the lane line; and determine the coordinate of the first reference point according to the information of the parallel line of the lane line, the information of the parallel line of the horizon, and the route information.

According to one or more embodiments of the present disclosure, the first determining module 902 includes a first determining unit and a second determining unit; the first determining unit is configured to select a second predetermined amount of coordinate points in a route direction, and determine the information of the parallel line of the horizon of the second predetermined amount of coordinate points; and the second determining unit is configured to determine the coordinate of an intersection point between the parallel line of the horizon and the parallel line of the lane line according to the information of the parallel line of the horizon and the information of the parallel line of the lane line, and use the coordinate of the intersection point as the coordinate of the first reference point.

According to one or more embodiments of the present disclosure, the first determining module 902 includes a third determining unit configured to: fit the parallel line of the lane line according to the detection result of the lane line; and determine the information of the parallel line of the horizon according to the fitted parallel line of the lane line.

According to one or more embodiments of the present disclosure, the camera is mounted at a first position of the vehicle, and the first position is a position where the lane line on the road surface can be photographed.

According to one or more embodiments of the present disclosure, the detecting module 901 is configured to, if the vehicle is in a traveling state, detect a lane line of a vehicle traveling road surface according to a video stream of the road surface that is collected by a camera mounted on a vehicle.

According to one or more embodiments of the present disclosure, a pitch angle is any angle within the first predetermined angle range, and the horizontal declination angle is any angle within the second predetermined angle range.

Figure 11:
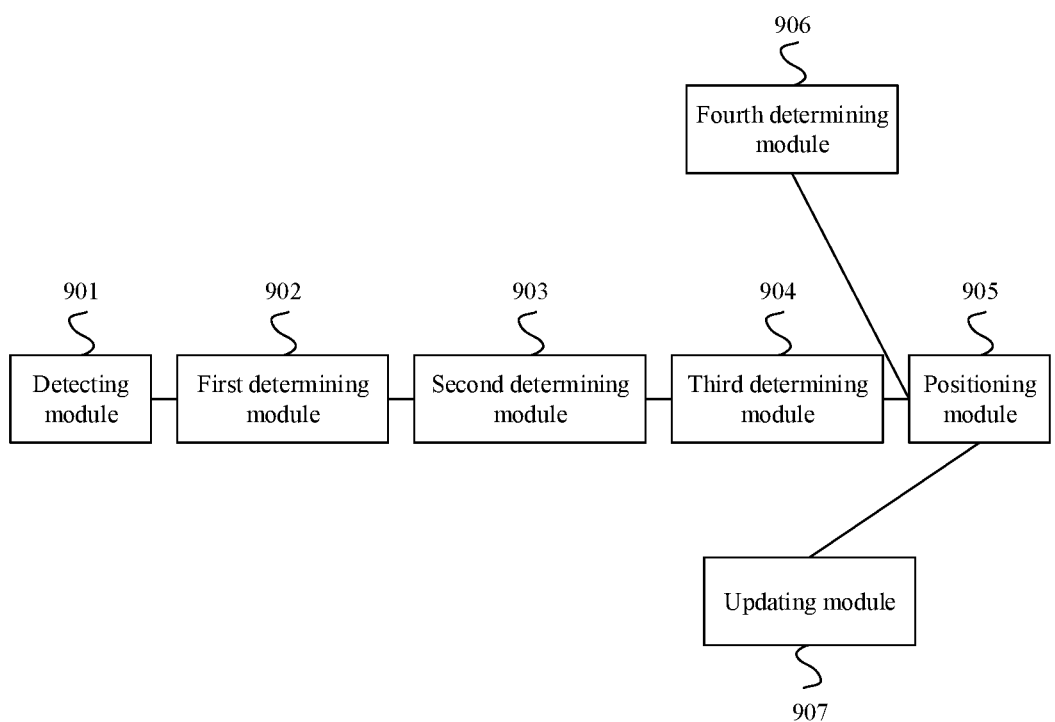
FIG. 11 is a third module structure diagram of a visual positioning apparatus embodiment provided by embodiments of the present disclosure.

FIG. 11 is a third module structure diagram of a visual positioning apparatus embodiment provided by embodiments of the present disclosure. As shown in FIG. 11, the apparatus further includes:

an updating module 907, configured to update the predetermined homography matrix, and use the first homography matrix as a new predetermined homography matrix.

According to one or more embodiments of the present disclosure, the first determining module 902 is further configured to: receive a calibration instruction, and based on the calibration instruction, determine first reference point information at a current angle of view of the camera according to a detection result of the lane line.

According to one or more embodiments of the present disclosure, the first determining module 902 is further configured to: determine whether the pose of the camera is changed, and if yes, determine first reference point information at a current angle of view of the camera according to a detection result of the lane line.

Figure 12:
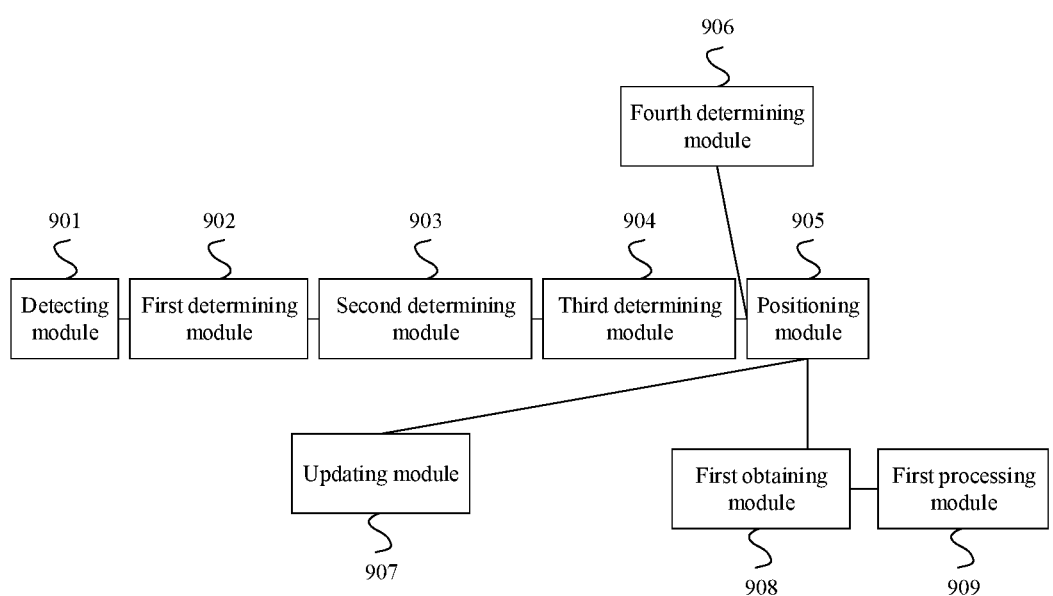
FIG. 12 is a fourth module structure diagram of a visual positioning apparatus embodiment provided by embodiments of the present disclosure.

FIG. 12 is a fourth module structure diagram of a visual positioning apparatus embodiment provided by embodiments of the present disclosure. As shown in FIG. 12, the apparatus further includes:

a first obtaining module 908, configured to obtain multiple first homography matrixes and multiple groups of calibration parameters within a first predetermined period; and a first processing module 909, configured to perform new positioning according to an average value of the multiple first homography matrixes and an average value of the multiple groups of calibration parameters.

Figure 13:
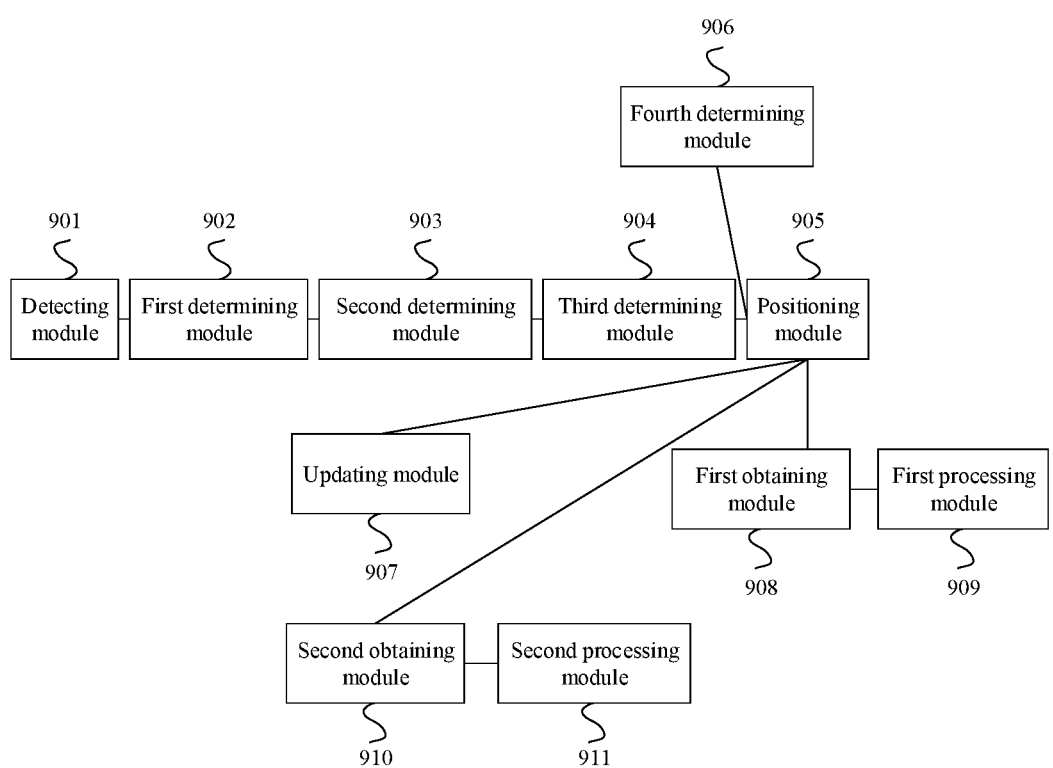
FIG. 13 is a fifth module structure diagram of a visual positioning apparatus embodiment provided by embodiments of the present disclosure.

FIG. 13 is a fifth module structure diagram of a visual positioning apparatus embodiment provided by embodiments of the present disclosure. As shown in FIG. 13, the apparatus further includes:

a second obtaining module 910, configured to obtain the first homography matrix and the calibration parameter according to a second predetermined periodic interval; and a second processing module 911, configured to perform new positioning according to the first homography matrix and the calibration parameter.

It should be noted that: during visual positioning, the visual positioning apparatus provided by the aforementioned embodiments is exemplified only by division of the various program modules above. In practical application, the processing above can allocated to different program modules for achievement as needed. That is, the internal structure of the apparatus is divided into different program modules to achieve all or some of the processing described above. In addition, the visual positioning apparatus embodiment provided by the aforementioned embodiments and the visual positioning method embodiment belong to the same concept. Please refer to the method embodiment for the specific implementation process of the visual positioning apparatus. The details are not described here again.

Figure 14:
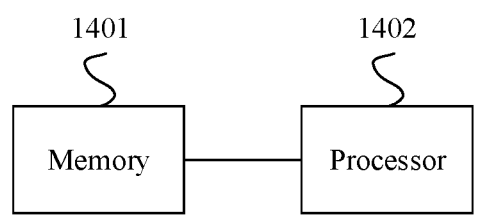
FIG. 14 is an entity block diagram of an electronic device provided by embodiments of the present disclosure.

FIG. 14 is an entity block diagram of an electronic device provided by embodiments of the present disclosure. As shown in FIG. 14, the electronic device includes:

a memory 1401, configured to store program instructions; and a processor 1402, configured to invoke and execute the program instructions in the memory to execute the operations of the method in the aforementioned method embodiment.

It can be understood that the memory 1401 may be a volatile memory or a non-volatile memory, and may also include both the volatile memory and the non-volatile memory. The non-volatile memory may be a Read Only Memory (ROM), a Programmable Read-Only Memory (PROM), a flash memory, a magnetic surface memory, an optical disc, or a Compact Disc Read-Only Memory (CD-ROM); and the magnetic surface memory may be a magnetic disc memory or a magnetic tape memory. The volatile memory may be a Random Access Memory (RAM), which acts as an external cache. By means of exemplary but not limited description, the RAM is available in many forms. The memory 1401 described in the embodiments of the present disclosure is aimed at including, but not limited to, these and any other suitable types of memory.

The method disclosed by the aforementioned embodiments of the present disclosure can be applied to the processor 1402, or is implemented by the processor 1402. The processor 1402 may be an integrated circuit chip and has a signal processing ability. During implementation, the operations of the aforementioned method can be completed by means of the integrated logic circuit of the hardware in the processor 1402 or instructions in the form of software. The processor 1402 may be a general-purpose processor, a Digital Signal Processor (DSP), or other programmable logic device, discrete gate or transistor logic device, discrete hardware component and the like. The processor 1402 can implement or execute the methods, the operations, and the logical block diagrams disclosed in the embodiments of the present disclosure. The general-purpose processor may be a microprocessor or any conventional processor.

Figure 15:
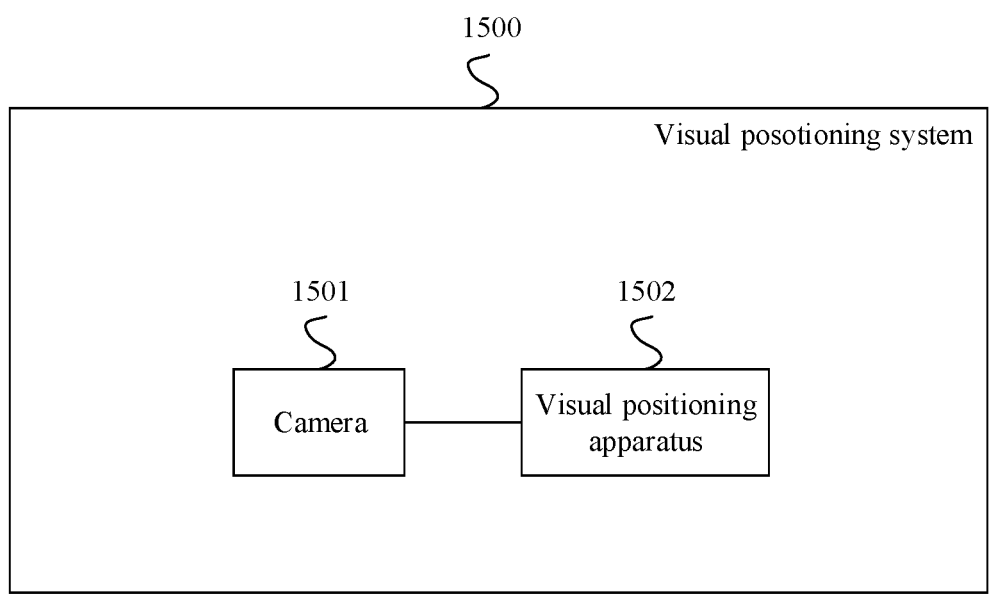
FIG. 15 is an architecture schematic diagram of a visual positioning system provided by embodiments of the present disclosure.

FIG. 15 is an architecture schematic diagram of a visual positioning system provided by embodiments of the present disclosure. The system is applied to a vehicle. As shown in FIG. 15, the system 1500 includes a camera 1501 mounted on the vehicle and the visual positioning apparatus 1502 connected to the camera 1501.

It should be understood that for the working process and the setting mode of each component, module or unit in any visual positioning apparatus, visual positioning system, and electronic device provided by the embodiments of the present disclosure, reference may be made to the corresponding description of the aforementioned method embodiments of the present disclosure. Details are not described repeatedly due to space limitation.

The embodiments of the present disclosure further provide a computer program, where the computer program enables a computer to implement the corresponding description of the aforementioned method embodiments of the present disclosure. Details are not described repeatedly due to space limitation.

A person of ordinary skill in the art can understand that: implementing all or some of the operations of the aforementioned method embodiments may be completed by a program by instructing related hardware. The preceding program may be stored in a computer readable storage medium. During execution, the program executes the operations of the aforementioned method embodiments; moreover, the preceding storage medium includes media capable of storing program codes, such as an ROM, an RAM, a magnetic disk, or an optical disc.

It should be understood that the disclosed device and method in the embodiments provided in the present disclosure may be implemented by means of other modes. The device embodiments described above are merely exemplary. For example, division of the units is merely logical function division and may be actually implemented by other division modes. For example, a plurality of units or components may be combined or integrated into another system, or some features may be ignored or not performed. In addition, the displayed or discussed mutual couplings or direct couplings or communication connections among the components may be implemented by means of some interfaces. The indirect couplings or communication connections between the devices or units may be implemented in electronic, mechanical, or other forms.

The units described as separate components may or may not be physically separate, and the components displayed as units may or may not be physical units, may be located at one position, or may be distributed on a plurality of network units. Some or all of the units may be selected according to actual needs to achieve the objectives of the solutions of the embodiments.

In addition, the functional units in the embodiments of the present disclosure may be integrated into one processing unit, or each of the units may exist as an independent unit, or two or more units are integrated into one unit, and the integrated unit may be implemented in the form of hardware, or may also be implemented in the form of a hardware and software functional unit.

A person of ordinary skill in the art may understand that: all or some operations of implementing the forgoing method embodiments may be achieved by a program by instructing related hardware; the foregoing program may be stored in a computer-readable storage medium; when the program is executed, operations in the foregoing method embodiments are performed; moreover, the foregoing storage medium includes various media capable of storing program codes such as an Read-Only Memory (ROM), the RAM, the magnetic disk, or the optical disk.

Alternatively, when the integrated unit of the present disclosure is implemented in a form of a software functional unit and sold or used as an independent product, the integrated unit may be stored in one computer readable storage medium. Based on such an understanding, the technical solutions in the embodiments of the present disclosure or some thereof contributing to the prior art may be essentially embodied in the form of software product. The computer software product is stored in one storage medium and includes several instructions so that one computer device (which may be a personal computer, a server, a network device, and the like) implements all or some operations of the method in the embodiments of the present disclosure. Moreover, the preceding storage medium includes media capable of storing program codes, such as a mobile storage device, the ROM, the RAM, the magnetic disk, or the optical disc.

The methods disclosed in the method embodiments provided by the present disclosure can be arbitrarily combined without causing conflicts so as to obtain a new method embodiment.

The features disclosed in the product embodiments provided by the present disclosure can be arbitrarily combined without causing conflicts so as to obtain a new product embodiment.

The features disclosed in the method or device embodiments provided by the present disclosure can be arbitrarily combined without causing conflicts so as to obtain a new method or device embodiment.

It should be explained at last that: the foregoing embodiments are merely intended for describing the technical solutions of the present disclosure other than limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, and such modifications or replacements do not departing the essence of the corresponding technical solutions from the scope of the technical solutions of the embodiments of the present disclosure.

The invention claimed is:

1. A visual positioning method, comprising:
    detecting a lane line of a road surface on which a vehicle travels based on a video stream of the road surface that is collected by a camera mounted on the vehicle;
    determining first reference point information at a current angle of view of the camera according to a detection result of the lane line;
    determining a third homography matrix according to the first reference point information and second reference point information, wherein the second reference point information is reference point information at a previous angle of view of the camera, a position of a second reference point corresponds to that of a first reference point, and the third homography matrix is used for representing a mapping relationship between a coordinate of the camera at the current angle of view and a coordinate of the camera at the previous angle of view;

determining a first homography matrix according to the third homography matrix and a predetermined homography matrix, wherein the predetermined homography matrix indicates a mapping relationship between the coordinate of the camera at the previous angle of view and a world coordinate at the previous angle of view; and performing positioning according to the first homography matrix.

2. The method according to claim 1, wherein the performing positioning according to the first homography matrix comprises:

calibrating the first homography matrix according to vertical calibration information and horizontal calibration information to obtain a calibration parameter; and performing positioning according to the calibration parameter and the first homography matrix.

3. The method according to claim 2, wherein the performing positioning according to the calibration parameter and the first homography matrix comprises:

determining a second homography matrix according to the calibration parameter and the first homography matrix, wherein the second homography matrix is obtained by calibrating a mapping relationship matrix between the coordinate of the camera at the current angle of view and a world coordinate at the current angle of view; and performing positioning by using the second homography matrix.

4. The method according to claim 3, wherein the determining a second homography matrix according to the calibration parameter and the first homography matrix comprises:

determining at least one sub-parameter of the calibration parameter according to a first predetermined number of coordinate points in a picture of the video stream collected by the camera, wherein the at least one sub-parameter is obtained after the calibration parameter is split; and determining the second homography matrix according to the at least one sub-parameter.

5. The method according to claim 2, wherein the performing positioning according to the calibration parameter and the first homography matrix comprises:

determining an intermediate matrix according to a homogeneous coordinate of a coordinate point in the picture of the video stream collected by the camera at the current angle of view and the first homography matrix; and performing linear computation on the intermediate matrix and the calibration parameter to obtain the world coordinate at the current angle of view.

6. The method according to claim 1, wherein the calibrating the first homography matrix to obtain a calibration parameter comprises:

determining a proportional coefficient for vertical calibration and an offset according to the detection result of the lane line, the first homography matrix, and information of a pitch angle of the camera; and determining a proportional coefficient for horizontal calibration according to the first homography matrix and information of a horizontal declination angle.

7. The method according to claim 6, wherein before the calibrating the first homography matrix to obtain a calibration parameter, the method further comprises:

determining the information of the pitch angle and the information of the horizontal declination angle according to the detection result of the lane line.

8. The method according to claim 1, wherein the determining first reference point information at a current angle of view of the camera according to a detection result of the lane line comprises:

determining information of a parallel line of the lane line and information of a parallel line of a horizon according to the detection result of the lane line; and determining the coordinate of the first reference point according to the information of the parallel line of the lane line, the information of the parallel line of the horizon, and route information.

9. The method according to claim 8, wherein the determining the coordinate of the first reference point according to the information of the parallel line of the lane line, the information of the parallel line of the horizon, and the route information comprises:

selecting a second predetermined number of coordinate points in a route direction;

determining the information of the parallel line of the horizon of the second predetermined number of coordinate points;

determining a coordinate of an intersection point between the parallel line of the horizon and the parallel line of the lane line according to the information of the parallel line of the horizon and the information of the parallel line of the lane line; and determining the coordinate of the intersection point as the coordinate of the first reference point.

10. The according to claim 8, wherein the determining information of a parallel line of the lane line and information of a parallel line of a horizon according to the detection result of the lane line comprises:

performing fitting of the parallel line of the lane line according to the detection result of the lane line; and determining the information of the parallel line of the horizon according to the fitted parallel line of the lane line.

11. The method according to claim 1, wherein the camera is mounted at a first position of the vehicle, and the first position is a position at which the lane line of the road surface is photographed.

12. The method according to claim 1, wherein the detecting a lane line of a road surface on which a vehicle travels according to a video stream of the road surface that is collected by a camera mounted on the vehicle comprises:

in condition that the vehicle is in a traveling state, detecting the lane line of the road surface on which the vehicle travels according to the video stream of the road surface that is collected by a camera mounted on the vehicle.

13. The method according to claim 1, wherein the method further comprises:

updating the predetermined homography matrix, and determining the first homography matrix as a new predetermined homography matrix.

14. The method according to claim 1, wherein the determining first reference point information at a current angle of view of the camera according to a detection result of the lane line comprises:
receiving a calibration instruction; and
determining, based on the calibration instruction, the first reference point information at the current angle of view of the camera according to the detection result of the lane line.

15. The method according to claim 1, wherein the determining the first reference point information at the current angle of view of the camera according to the detection result of the lane line comprises:
determining whether a pose of the camera is changed, and responsive to determining that the pose of the camera is changed, determining the first reference point information at the current angle of view of the camera according to the detection result of the lane line.

16. The method according to claim 1, wherein the method further comprises:
obtaining multiple first homography matrixes and multiple groups of calibration parameters within a first predetermined period; and
performing new positioning according to an average value of the multiple first homography matrixes and an average value of the multiple groups of calibration parameters.

17. The method according to claim 1, wherein the method further comprises:
obtaining the first homography matrix and the calibration parameter according to a second predetermined periodic interval; and
performing new positioning according to the first homography matrix and the calibration parameter.

18. A visual positioning apparatus, comprising:
a processor; and
a memory for storing instructions executable by the processor;
wherein the processor is configured to:
detect a lane line of a road surface on which a vehicle travels based on a video stream of the road surface that is collected by a camera mounted on the vehicle;
determine first reference point information at a current angle of view of the camera according to a detection result of the lane line;
determine a third homography matrix according to the first reference point information and second reference point information, wherein the second reference point information is reference point information at a previous angle of view of the camera, a position of a second reference point corresponds to that of a first reference point, and the third homography matrix is used for representing a mapping relationship between a coordinate of the camera at the current angle of view and a coordinate of the camera at the previous angle of view;
determine a first homography matrix according to the third homography matrix and a predetermined homography matrix, wherein the predetermined homography matrix indicates a mapping relationship between the coordinate of the camera at the previous angle of view and a world coordinate at the previous angle of view; and
perform positioning according to the first homography matrix.

19. A visual positioning system, applied to a vehicle, comprising a camera mounted on the vehicle and the visual positioning apparatus according to claim 18, wherein the visual positioning apparatus is communicatively connected to the camera.

20. A non-transitory computer-readable storage medium having a computer program stored therein, wherein execution of the computer program by a processor causes the processor to implement:
detecting a lane line of a road surface on which a vehicle travels based on a video stream of the road surface that is collected by a camera mounted on the vehicle;
determining first reference point information at a current angle of view of the camera according to a detection result of the lane line;
determining a third homography matrix according to the first reference point information and second reference point information, wherein the second reference point information is reference point information at a previous angle of view of the camera, a position of a second reference point corresponds to that of a first reference point, and the third homography matrix is used for representing a mapping relationship between a coordinate of the camera at the current angle of view and a coordinate of the camera at the previous angle of view;
determining a first homography matrix according to the third homography matrix and a predetermined homography matrix, wherein the predetermined homography matrix indicates a mapping relationship between the coordinate of the camera at the previous angle of view and a world coordinate at the previous angle of view; and
performing positioning according to the first homography matrix.

* * * * *